US009868357B2

(12) United States Patent
McCalmont et al.

(10) Patent No.: US 9,868,357 B2
(45) Date of Patent: Jan. 16, 2018

(54) ELECTRIC VEHICLE CHARGING SYSTEMS AND METHODS

(71) Applicant: Paired Power, Inc., Campbell, CA (US)

(72) Inventors: David Thompson McCalmont, Palo Alto, CA (US); Donald Martin Bray, Los Altos, CA (US); Aaron William McCalmont, Santa Clara, CA (US); Jonathan Scott McCalmont, San Jose, CA (US)

(73) Assignee: Paired Power, Inc., Campbell, CA (US)

( * ) Notice: Subject to any disclaimer, the term of this patent is extended or adjusted under 35 U.S.C. 154(b) by 174 days.

(21) Appl. No.: 14/720,270

(22) Filed: May 22, 2015

(65) Prior Publication Data

US 2016/0101704 A1  Apr. 14, 2016

Related U.S. Application Data

(60) Provisional application No. 62/062,087, filed on Oct. 9, 2014.

(51) Int. Cl.

| H02J 7/00 | (2006.01) |
|---|---|
| B60L 11/18 | (2006.01) |
| H02J 7/35 | (2006.01) |
| H02J 1/10 | (2006.01) |
| H02J 3/38 | (2006.01) |

(52) U.S. Cl.
CPC ............ *B60L 11/1809* (2013.01); *H02J 1/10* (2013.01); *H02J 3/383* (2013.01); *H02J 7/35* (2013.01); *Y02B 10/14* (2013.01); *Y02E 10/563* (2013.01); *Y02E 10/566* (2013.01); *Y02E 60/721* (2013.01); *Y04S 10/126* (2013.01)

(58) Field of Classification Search
CPC .................................................. B60L 11/1809
USPC ......................................................... 320/101
See application file for complete search history.

(56) References Cited

U.S. PATENT DOCUMENTS

| 4,175,249 A | 11/1979 | Gruber |
| 4,182,960 A | 1/1980 | Reuyl |
| 4,186,336 A | 1/1980 | Weinberg |
| 6,218,605 B1 | 4/2001 | Dally |
| 6,262,558 B1 | 7/2001 | Weinberg |
| 7,531,741 B1 | 5/2009 | Melton |
| 8,022,667 B2 | 9/2011 | Anderson |
| 8,120,308 B2 | 2/2012 | Ward |

(Continued)

FOREIGN PATENT DOCUMENTS

| DE | 102009039884 A1 | 3/2011 |
| EP | 0051959 A1 | 5/1982 |

(Continued)

*Primary Examiner* — Suresh Memula
(74) *Attorney, Agent, or Firm* — Steven R. Sponseller; Stevens Law Group

(57) ABSTRACT

Example electric vehicle charging systems and methods are described. In one implementation, an electric vehicle charging system includes multiple solar cells and a power manager coupled to the multiple solar cells. The power manager receives power signals from each of the solar cells and generates an output signal based on at least a portion of the received power signals. The output signal has an associated voltage and/or current that is within an acceptable operating range for charging an electric vehicle.

17 Claims, 11 Drawing Sheets

(56) References Cited

U.S. PATENT DOCUMENTS

| | | | |
|---|---|---|---|
| 8,143,841 B2 | 3/2012 | Gochenaur | |
| 8,387,318 B2 | 3/2013 | Kaufman | |
| 2004/0065025 A1 | 4/2004 | Durham | |
| 2010/0181957 A1* | 7/2010 | Goeltner | B60L 8/003 320/101 |
| 2011/0301790 A1* | 12/2011 | Atluri | B60K 16/00 701/22 |
| 2012/0133322 A1* | 5/2012 | Walsh | B60L 8/00 320/101 |
| 2012/0161692 A1* | 6/2012 | Kobayashi | B60L 11/1862 320/101 |
| 2012/0313568 A1 | 12/2012 | Paluszek | |
| 2013/0073428 A1 | 3/2013 | Thramann | |
| 2013/0076294 A1 | 3/2013 | Smith | |
| 2013/0080254 A1 | 3/2013 | Thramann | |
| 2014/0077626 A1 | 3/2014 | Levy | |
| 2014/0196387 A1 | 7/2014 | Neito | |
| 2014/0197684 A1* | 7/2014 | Masato | H02J 7/35 307/9.1 |
| 2014/0217983 A1* | 8/2014 | McCalmont | H02J 1/10 320/128 |

FOREIGN PATENT DOCUMENTS

| | | |
|---|---|---|
| EP | 1160876 A2 | 12/2001 |
| EP | 1626140 A2 | 2/2006 |
| EP | 2292877 A1 | 3/2011 |
| WO | WO2011140557 A1 | 11/2011 |
| WO | WO2013057325 A1 | 4/2013 |

\* cited by examiner

ELECTRIC VEHICLE CHARGING SYSTEMS AND METHODS

CROSS REFERENCE TO RELATED APPLICATIONS

This application claims the benefit of U.S. Provisional Application Ser. No. 62/062,087, entitled "Electric Vehicle Charging Systems and Methods," filed Oct. 9, 2014, the disclosure of which is incorporated herein by reference in its entirety.

TECHNICAL FIELD

The present disclosure relates to systems and methods for charging electric vehicles.

BACKGROUND

The growing use of electric vehicles requires an increased number of charging locations capable of recharging the batteries contained in the electric vehicles. Some retail locations and commercial campuses provide limited parking spaces with electric vehicle charging connections. Providing electric power to parking spaces for the purpose of charging electric vehicles typically requires installing electric power lines across part of the parking area. This installation of power lines can be costly, especially when the source of the electric power is a significant distance from the parking area. Additionally, existing electric power panels (or other electric circuits) may not have enough additional capacity and may need to be upgraded to support charging of electric vehicles. Thus, installation of electric vehicle charging connections in parking areas can be difficult and expensive.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
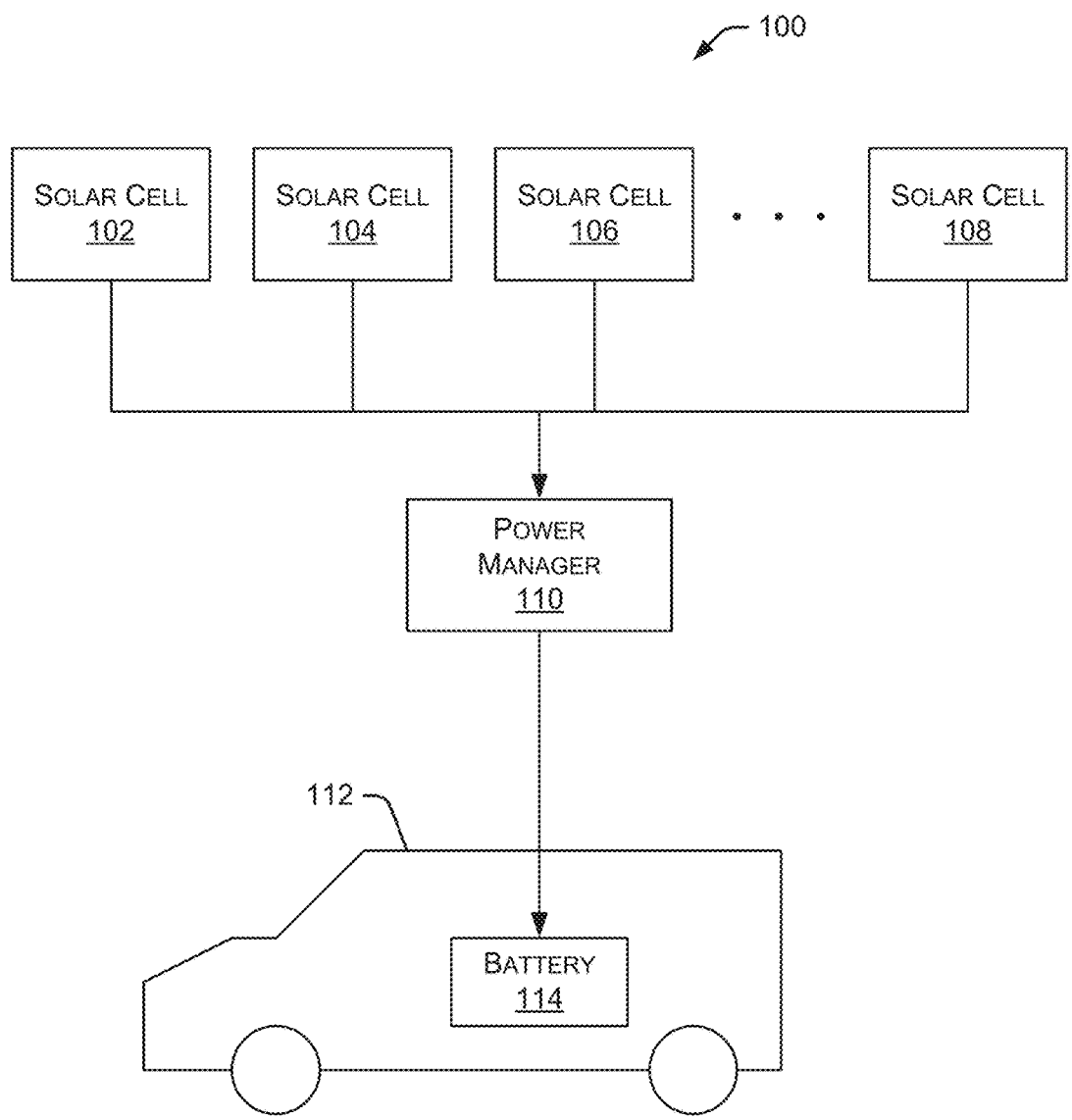
FIG. 1 is a block diagram depicting an embodiment of an electric vehicle charging system.

In the following description, reference is made to the accompanying drawings that form a part thereof, and in which are shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, system, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means that implement the function/act specified in the flow diagram and/or block diagram block or blocks.

The systems and methods described herein support the charging of one or more electric vehicles. In some embodiments, the systems and methods can charge multiple electric vehicles simultaneously using one or more arrays of solar cells, photovoltaic modules, and the like. As used herein, "solar cells" refers to any photovoltaic module or other mechanism that converts solar energy into an electrical signal. As described herein, certain implementations can charge one or more electric vehicles directly from the solar cells without the need for an intermediate battery to store the energy collected from the solar cells.

The systems and methods described herein support the charging of one or more electric vehicles using solar cells and other power sources. The use of solar cells allows charging locations to be created without the need for a connection to a traditional power grid. This simplifies creation of the charging locations and avoids problems caused by fully utilized electrical panels and other electrical circuits. These systems and methods eliminate the time and expense required to create buried or overhead connections for power lines connected to the power grid.

Some embodiments may include a connection to the power grid in addition to solar cells and other power sources. For example, certain embodiments can avoid the occurrence of demand charges and other costs of grid-only systems. When demand charges are high, the system can access power from solar cells or other power sources. When grid-based power is less expensive, or when solar power is not available (e.g., at night), the system may access power from the grid.

Charging locations, as discussed herein, can be located anywhere, but are particularly useful in areas where drivers park their electric vehicles for a period of time, such as a corporate campus, shopping center, retail store, school, convention center, sports arena, apartment building, and the like. As adoption of electric vehicles grows and becomes more prevalent, the demand for charging locations that provide a charge over an extended period of time, such as workplace charging, will increase. In these types of locations, drivers of electric vehicles can enjoy the convenience of charging their vehicle while working, shopping, or performing other activities. Providing these charging locations is beneficial to, for example, business owners and employers who want to provide charging stations for drivers and/or employees without incurring costly installations requiring access to the power grid.

FIG. 1 is a block diagram depicting an embodiment of an electric vehicle charging system 100. Multiple solar cells 102, 104, 106 and 108 are electrically coupled to a power manager 110. Solar cells 102-108 provide power signals to power manager 110. These power signals may include a voltage and/or a current. Power manager 110 is electrically coupled to one or more electric vehicles 112, each of which includes one or more batteries 114. Power manager 110 may perform a variety of functions, such as consolidating power signals received from solar cells 102-108. The power signals from solar cells 102-108 are consolidated into an output signal that is provided to electric vehicle 112.

In some embodiments, power manager 110 can adjust the voltage level of an output signal provided to electric vehicle 112 for charging that electric vehicle. Power manager 110 maintains the output voltage level within an acceptable range for the vehicle being charged. In some embodiments, power manager 110 can adjust the current level of the output signal provided to electric vehicle 112. For example, power manager 110 can maintain the output current level within an acceptable range for the vehicle being charged. As used herein, the "output signal" may contain a voltage and/or a current. In some embodiments, power manager 110 includes a passive switching matrix or an active device, such as a DC-to-DC converter or a computer-managed power boost or buck system. In other embodiments, power manager 110 includes an inverter or similar mechanism to deliver power to one or more electric vehicles. Some electric vehicles are charged through an L3 (Level 3) port using DC, while other electric vehicles are charged through an L2 (Level 2) port using AC. As frequently used in the electric vehicle EV industry, Level 1 refers to a 120 VAC charging port, Level 2 refers to a 240 VAC charging port, and Level 3 refers to ports with higher charging voltages, such as 3-phase power (208 VAC or 480 VAC) or direct DC. Typically, the rate of charge (i.e., the speed at which an electric vehicle can be charged) is lowest for Level 1 ports. Level 2 ports can generally charge at a faster rate than Level 1 ports, and Level 3 ports can generally charge faster than Level 2 ports. For example, in some embodiments, a Level 1 port may charge an electric vehicle in approximately 15 hours. A Level 2 port may charge the same electric vehicle in approximately four hours, and a Level 3 port may charge the same electric vehicle in approximately 30 minutes. However, some electric vehicles include onboard chargers that regulate (or restrict) the rate at which the electric vehicle can be charged, regardless of the charging level. In some electric vehicle or electric vehicle charger implementations, Level 1 and Level 2 ports are discussed with respect to AC charging and Level 3 ports are discussed with respect to DC charging.

Using an inverter, the system can receive DC power from a solar cell, convert the power to AC (with the inverter), and deliver the AC power to the electric vehicle's Level 2 port. Electric vehicle 112 may be any type of car, truck, bus, motorcycle, scooter, bicycle, and the like. Battery 114 stores a charge within electrical vehicle 112 to power that electric vehicle.

Figure 2:
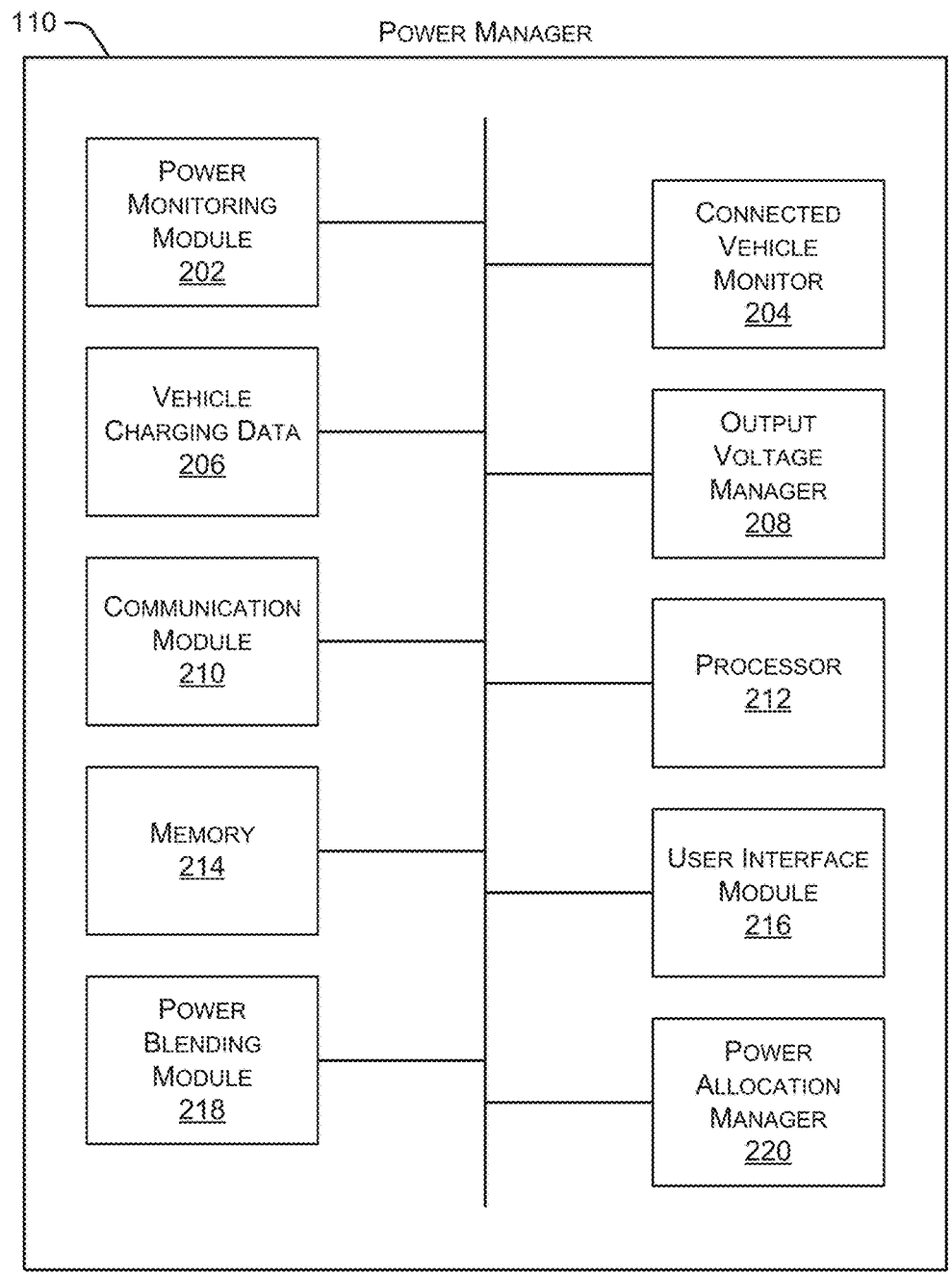
FIG. 2 is a block diagram depicting an embodiment of a power manager.

FIG. 2 is a block diagram depicting an embodiment of power manager 110. In this example, power manager 110 includes a power monitoring module 202 and a connected vehicle monitor 204. Power monitoring module 202 is capable of monitoring the power received from solar cells 102-108, a power grid, or a battery. Connected vehicle monitor 204 operates to monitor one or more electric vehicles 112 connected to power manager 110. For example, connected vehicle monitor 204 may monitor a vehicle type, a type of charger required (such as Level 2 or Level 3) and an active charging status (such as state of charge, or SOC, percentage) of the vehicle's battery 114.

Power manager 110 also includes vehicle charging data 206 and an output voltage manager 208. Vehicle charging data 206 may include how much power has been provided to a particular electric vehicle 112 during any time period (e.g., power provided during the current day, week, month and so forth.) Output voltage manager 208 monitors and adjusts, as needed, the voltage level of the output signal provided to electric vehicle 112. In some embodiments, output voltage manager 208 also monitors and adjusts the level of the current (or any other signal characteristics) associated with the output signal provided to electric vehicle 112. In alternate embodiments, output voltage manager 208 is referred to as an "output signal manager." In additional embodiments, output voltage manager 208 may include (or may utilize) an inverter that allows output voltage manager 208 to convert DC signals to AC signals, as well as manage voltage and current.

In some embodiments, power manager 110 includes a communication module 210 and a processor 212. Communication module 210 allows power manager 110 to communicate with other systems or devices via any communication medium and using any communication protocol. Processor 212 performs various functions necessary to perform the methods and operations discussed herein with respect to charging electric vehicles. A memory 214 stores various data used by the described systems and methods as well as other components and modules in power manager 110. A user interface module 216 allows a user to interact with power manager 110 and perform various operations, such as entry of user requirements, system configuration, data access, data reporting, user billing, and the like. A power blending module 218 manages the blending (or consolidation) of power signals from one or more sources (e.g., solar cells, external battery, another electric vehicle or a power grid). A power allocation manager 220 handles the allocation of power resources among multiple electric vehicles. For example, power allocation manager 220 may allocate power received from multiple solar cells among the electric vehicles currently being charged. The allocation may distribute the power equally among all electric vehicles or may distribute the power, for example, in proportion to the charging needs of each electric vehicle, the time available to charge each electric vehicle or the fee paid by each vehicle owner to charge their electric vehicle.

Figure 3:
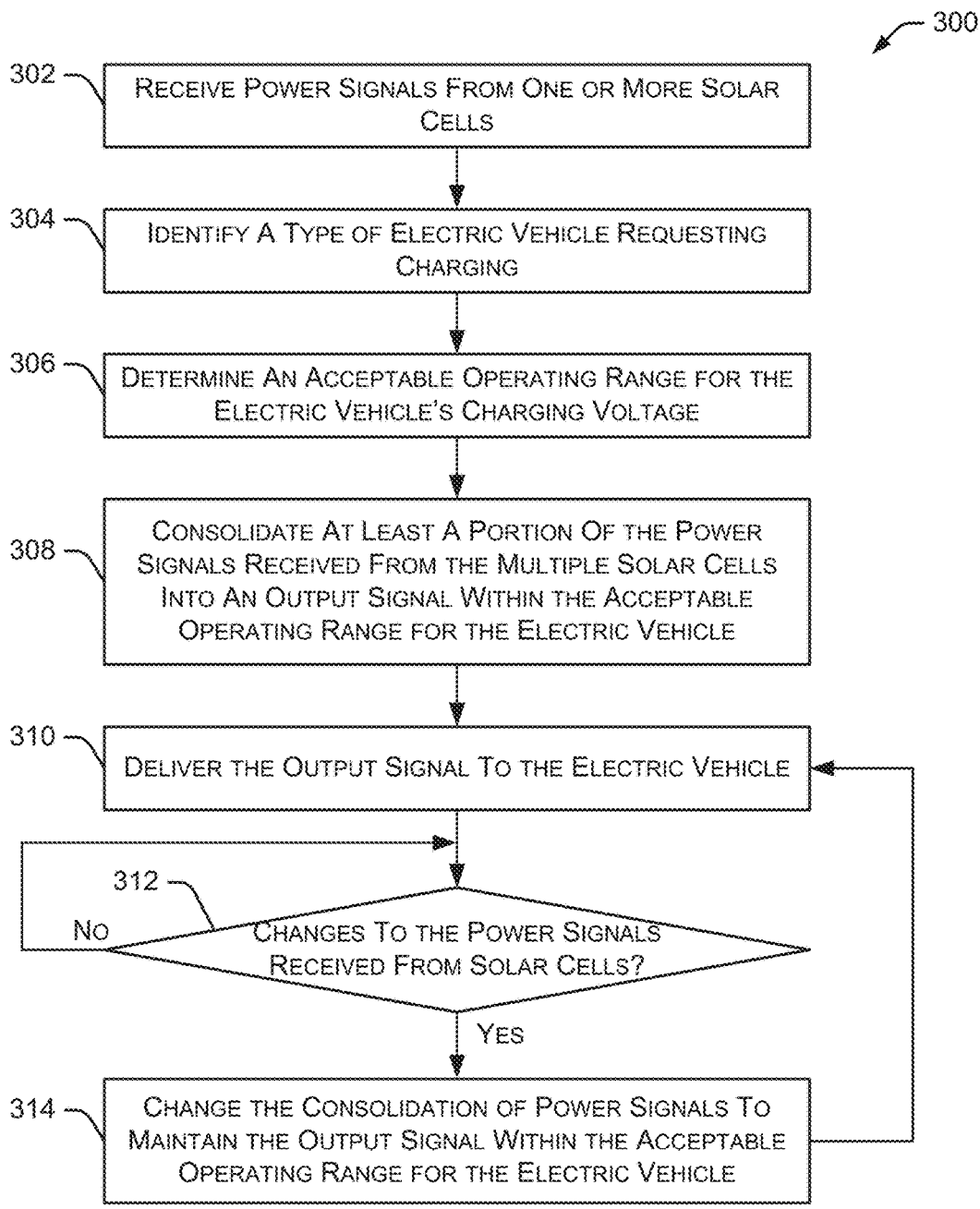
FIG. 3 is a flow diagram depicting an embodiment of a method for charging an electric vehicle.

FIG. 3 is a flow diagram depicting an embodiment of a method 300 for charging an electric vehicle. Method 300 is implemented, for example, within power manager 110. Initially, a power signal is received from one or more solar cells at 302. Method 300 identifies a type of electric vehicle requesting charging at 304 and determines an acceptable operating range for the electric vehicle's charging voltage at 306. In some embodiments, to determine the type of electric vehicle, method 300 uses a CANbus (Controller Area Network bus) and CHAdeMO specification to communicate with the electric vehicle. Once the described systems and methods begin communicating with the electric vehicle, the IV curve (Current-Voltage, discussed below) is used to adjust the voltage. The communication with the electric vehicle can indicate the acceptable operating range for the electric vehicle's charging voltage. In some embodiments, the type of electric vehicle is determined based on the battery voltage of the electric vehicle or the manner in which the electric vehicle communicates signals over the CANbus or CHAdeMO connection.

Most batteries in electric vehicles expect a certain voltage to charge. Solar panels are capable of providing different voltages and follow the IV curve (discussed below) to the voltage being requested by the electric vehicle. The solar panels deliver the current that is available based on the IV curve (which is based on the presently available light intensity). Since batteries do not have IV curves, they need a particular voltage (or voltage range) to charge properly. Thus, when charging from a first battery to a second battery, some embodiments will require an additional component (such as a DC-DC converter) between the two batteries to adjust the voltage being applied from the first battery to the second battery to ensure that the voltage applied to the second battery is within that battery's charging voltage range.

In some embodiments, method 300 may also determine an acceptable operating range for the electric vehicle's charging current. Method 300 may also consider other operating requirements, such as power allocation requirements among multiple vehicles and/or user-specified charging requirements.

Method 300 continues at 308 by consolidating at least a portion of the power signals received from the multiple solar cells into an output signal within the acceptable operating range (e.g., voltage and/or current operating ranges) for the type of electric vehicle requesting charging. The output signal is delivered to the electric vehicle at 310. Method 300 determines at 312 whether changes have occurred in the power signals received from the solar cells. For example, if a cloud temporarily blocks some of the sunlight reaching the solar cells, the voltage and/or current level of the power signals received from the solar cells may decrease. If changes are detected, method 300 makes necessary changes to the consolidation of the power signals to maintain the output signal within the acceptable operating range for the electric vehicle being charged. In some embodiments, method 300 determines if there are changes to a vehicle charging status or associated charging requirements that would necessitate a change in the output signal delivered to the electric vehicle.

As shown in FIG. 3, step 312 detects any changes to the power signals received from the solar cells. In alternate embodiments, step 312 may detect any type of change in the described systems, such as changes in vehicle charge requirements, connecting an additional electric vehicle, disconnecting an electric vehicle, and the like.

Figure 4:
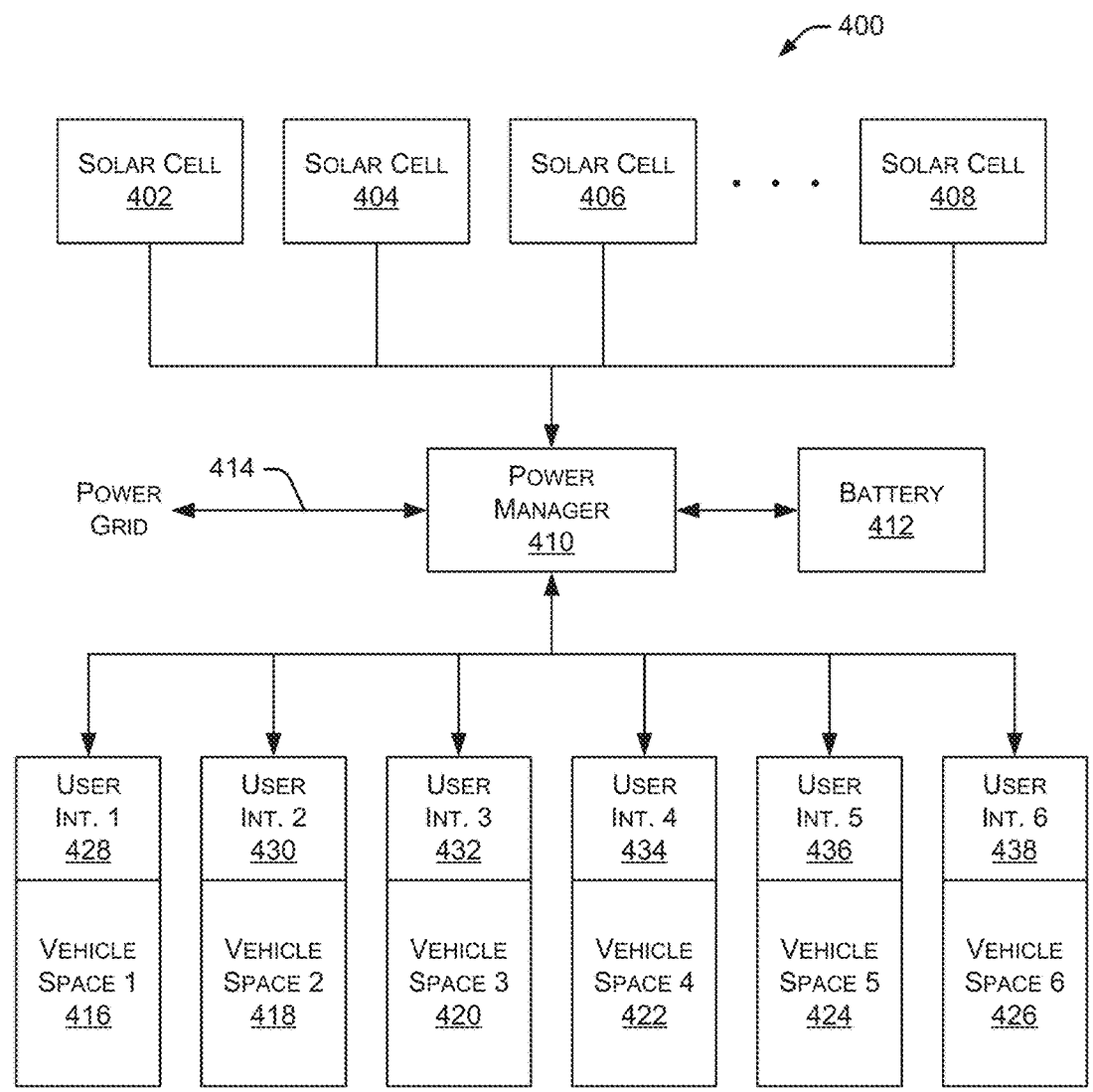
FIG. 4 is a block diagram depicting an embodiment of a charging location capable of charging multiple electric vehicles.

FIG. 4 is a block diagram depicting an embodiment of a charging location 400 capable of charging multiple electric vehicles. Charging location 400 includes multiple solar cells 402, 404, 406, and 408 coupled to a power manager 410. In some embodiments, solar cells 402-408 are similar to solar cells 102-108 discussed above with respect to FIG. 1. And, power manager 410 is similar to power manager 110 discussed above regarding FIG. 1 and FIG. 2. Power manager 410 is also coupled to a battery 412 and can receive power from a power grid source via connection 414. Battery 412 is also referred to as an "external battery" since it is external to (i.e., not contained within) an electric vehicle. Battery 412 is capable of storing power received from multiple sources, such as solar cells 402-408, power grid connection 414 or from one or more electric vehicles coupled to power manager 410. Additionally, battery 412 is capable of providing power to multiple sources, such as one or more electric vehicles coupled to power manager 410.

Charging location 400 also includes six vehicle spaces 416, 418, 420, 422, 424, and 426. Vehicle spaces 416-426 are also referred to as "parking spaces," and can be arranged in any configuration. Typically, vehicle spaces 416-426 are located adjacent to one another to simplify connection to, and management by, power manager 410. Each vehicle space 416-426 includes a user interface module 428, 430, 432, 434, 436, and 438, respectively. User interface modules 428-438 allow a user (e.g., a driver of an electric vehicle parked in one of the vehicle spaces 416-426) to interact with power manager 410. For example, users may login to an account, set vehicle charging parameters, pay for vehicle charging fees, and the like by interacting with the user interface module associated with the vehicle space within which the user's electric vehicle is parked. In particular examples, user interface modules 428-438 are implemented using one or more computing devices. These computing devices include a user interface that allows an individual to interact via a keyboard, screen, voice command, a mobile app, a scanning app that scans a bar code or other code, and the like. In some embodiments, users can interact with user interface modules 428-438 through a remote device (not shown in FIG. 4), such as a mobile device, a remote computing device or any other device capable of communicating with user interface modules 428-438.

In some embodiments, a single user interface module is provided for all vehicle spaces 416-426, such that all users of electric vehicles parked in vehicle spaces 416-426 use the same user interface module. For example, the single user interface module may be implemented as a kiosk located proximate to vehicle spaces 416-426.

Charging location 400 also includes a physical connector (not shown) to couple an electric vehicle in a vehicle space to power manager 410. For example, the physical connector may be an electrical connector that allows energy to flow from power manager 410 to the electric vehicle to charge one or more batteries contained in the electric vehicle. Additionally, the physical connector may allow the flow of electricity out of the electric vehicle's battery, such as when the electric vehicle's battery charge is being used to charge another electric vehicle or charge battery 412.

In a particular implementation, charging location 400 includes an overhead canopy that covers one or more of vehicle spaces 416-426. Solar cells 402-408 are located on the canopy. In a particular example, 44 to 50 solar panels are located on a canopy that covers six vehicle spaces. The canopy provides shade to the electric vehicles parked in the covered vehicle spaces and provides a platform to support the solar cells. Additionally, the canopy may include lights for illuminating the charging location 400 at night. These lights may be powered by the power grid or a battery that is charged during daylight hours by the solar cells. The electric vehicles being charged at charging location 400 may be charged serially or simultaneously.

Figure 5:
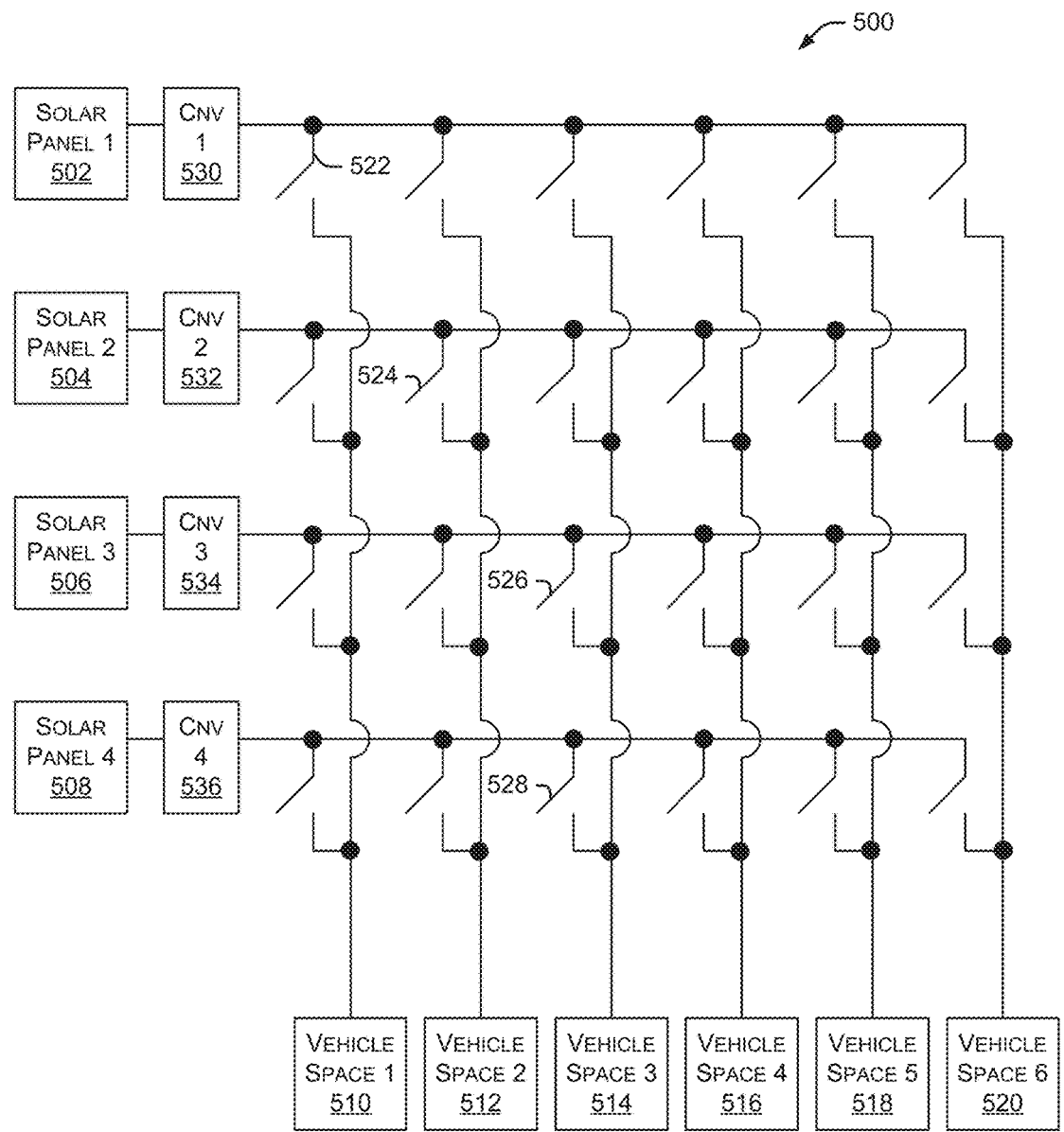
FIG. 5 is a block diagram depicting an embodiment of a switching system for connecting multiple solar panels to multiple electric vehicle spaces.

FIG. 5 is a block diagram depicting an embodiment of a switching system 500 for connecting multiple solar panels to multiple electric vehicle spaces. The embodiment of FIG. 5 includes four solar panels 502, 504, 506, and 508 in addition to four power converters 530, 532, 534, and 536. Each solar panel 502-508 may contain any number of solar cells arranged in any configuration. In alternate embodiments, a system may contain any number of solar panels and/or power converters. In some embodiments, the power converters perform functions similar to power manager 110 or output signal manager 208, discussed herein. In certain implementations, the power converters are DC-DC converters or inverters or a circuit that transmogrifies voltage to current, or current to voltage. Six vehicle spaces 510, 512, 514, 516, 518, and 520 can be coupled to any of the solar panels 502-508 by activating the appropriate switches. In some embodiments, the activation of the switches is controlled by power manager 110 or 410 to regulate the amount of power provided from solar panels 502-508.

In a specific example, three electric vehicles are located in vehicle spaces 510, 512, and 514. The vehicles are coupled to power manager 110 or 410, which can close switch 522 to provide power from solar panel 502 to the electric vehicle in vehicle space 510. Similarly, power manager 110 or 410 can close switch 524 to provide power from solar panel 504 to the electric vehicle in vehicle space 512. Finally, power manager 110 or 410 can close switches 526 and 528 to combine power from solar panels 506 and 508 to the electric vehicle in vehicle space 514.

In particular implementations, power manager 110 or 410 can control the distribution of power from a particular solar panel to multiple electric vehicles. For example, power manager 110 or 410 can allocate a certain percentage (e.g., 25%) of power from solar panels 502 through 508 to the electric vehicle in vehicle space 510 and allocate a different percentage (e.g., 75%) of power from solar panels 502 through 508 to the electric vehicle in vehicle space 520. In some embodiments, additional components such as DC-to-DC converters are used to isolate batteries in electric vehicles from one another and to ensure that voltages in different batteries are matched to properly deliver current from one electric vehicle to another. In particular implementations, the allocation of percentages from the solar panels to the multiple electric vehicles may change over time. For example, the 25/75 allocation mentioned above may occur during a first time period. The allocation is then changed (e.g., 50/50) during a second time period. This allocation is based on various factors, such as a charging priority associated with each electric vehicle, an amount paid by the user of the electric vehicle, the amount of charge needed by each electric vehicle, the time available to charge each electric vehicle, and the like.

In alternate embodiments, switching system 500 may include additional components to manage the distribution of power from the solar panels 502-508 to one or more electric vehicles in spaces 510-520. For example, additional power management components may be included in switching system 500 between the switches and the vehicle spaces 510-520. In some embodiments, the additional power management components convert voltage to current, or current to voltage, or convert one DC voltage to a different DC voltage through a DC-DC converter, or convert a DC voltage to an AC voltage through an inverter. The additional power management components may also provide safety functions, such as ground-fault detection.

In some embodiments, an inverter is put in line with the solar panels to deliver AC power to one or more electric vehicles (in vehicle spaces 510-520) through a Level 2 port. In other embodiments, power converters 530-536 may also use DC-DC converters, which would be useful if the system did not attain sufficient voltage or attained too high a voltage from the solar panels and it was necessary either to "step up" or "step down" the voltage from the solar panels to match the required electric vehicle battery voltage.

Figure 6:
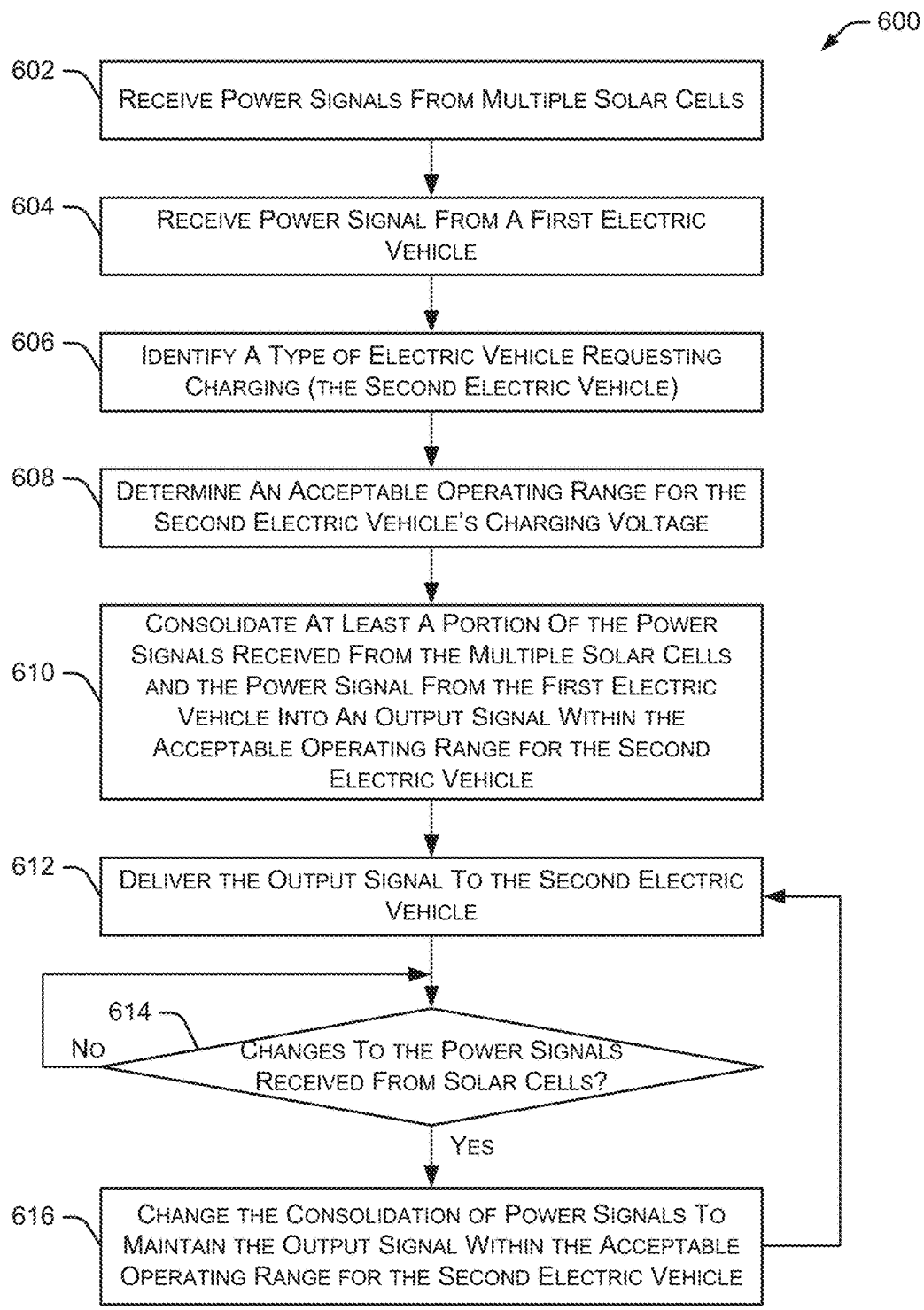
FIG. 6 is a flow diagram depicting an embodiment of a method for charging an electric vehicle using solar cells and power from another electric vehicle.

FIG. 6 is a flow diagram depicting an embodiment of a method 600 for charging an electric vehicle using solar cells and power from another electric vehicle. Method 600 is implemented, for example, within power manager 110 or 410. Initially, power signals are received from multiple solar cells at 602 and from a first electric vehicle at 604. Method 600 identifies a type of electric vehicle requesting charging at 606 (referred to as the "second electric vehicle") and determines an acceptable operating range for the second electric vehicle's charging voltage at 608. In some embodiments, method 600 also determines an acceptable operating range for the second electric vehicle's charging current. Method 600 may also consider other operating requirements, such as power allocation requirements among multiple vehicles or user-specified charging requirements.

Method 600 continues at 610 by consolidating at least a portion of the power signals received from the multiple solar cells and the power signal received from the first electric vehicle into an output signal within the acceptable operating range (e.g., voltage and/or current operating ranges) for the second electric vehicle.

When consolidating power signals from multiple sources, the consolidation process will vary depending on the power resources and the number of vehicles being charged. For example, if a single electric vehicle is present, the power manager can consolidate all power signals to that single electric vehicle. If another electric vehicle is present, the power manager can allocate the power signals among the multiple electric vehicles based on driver preferences, charging needs of each vehicle, and the like. In some embodiments, the power signals are consolidated by connecting different strings of solar panels to different electric vehicles. Each string of solar panels can deliver a different IV curve. For example, if one electric vehicle needs a slow charge, one string of solar panels is connected to that electric vehicle. If another electric vehicle needs a faster charge, two strings of solar panels may be combined such that the output from those two strings of solar panels is provided to the second electric vehicle. The IV curve will "settle" to the battery voltage being requested by the electric vehicle being charged.

The output signal is delivered to the second electric vehicle at 612. Method 600 determines at 614 whether changes have occurred in the power signals received from the solar cells. For example, if a cloud temporarily blocks some of the sunlight reaching the solar cells, the voltage and/or current level of the power signals received from the solar cells may decrease. If changes are detected, method 600 makes necessary changes to the consolidation of the power signals to maintain the output signal within the acceptable operating range for the second electric vehicle at 616. In some embodiments, method 600 determines if there are changes to a vehicle charging status or associated charging requirements that would necessitate a change in the output signal delivered to the second electric vehicle.

Figure 7:
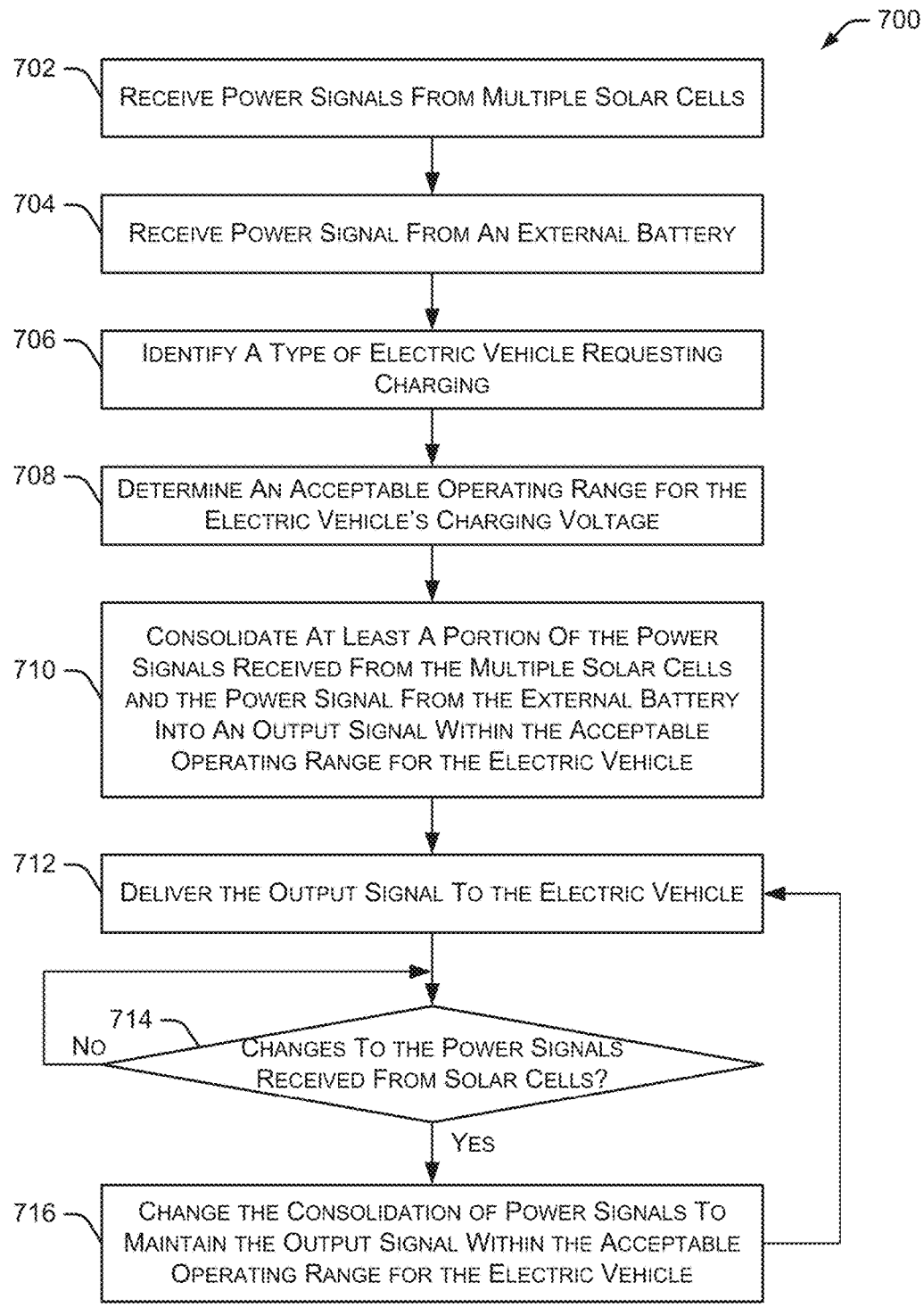
FIG. 7 is a flow diagram depicting an embodiment of a method for charging an electric vehicle using solar cells and an external battery.

FIG. 7 is a flow diagram depicting an embodiment of a method 700 for charging an electric vehicle using solar cells and an external battery. In some embodiments, method 700 is implemented within power manager 110 or 410. Initially, power signals are received from multiple solar cells at 702 and from an external battery at 704. Method 700 identifies a type of electric vehicle requesting charging at 706 and determines an acceptable operating range for the electric vehicle's charging voltage at 708. In some embodiments, method 700 also determines an acceptable operating range for the electric vehicle's charging current. Method 700 may also consider other operating requirements, such as power allocation requirements among multiple vehicles or user-specified charging requirements.

Method 700 continues at 710 by consolidating at least a portion of the power signals received from the multiple solar cells and the power signal received from the external battery into an output signal within the acceptable operating range (e.g., voltage and/or current operating ranges) for the electric vehicle. In some embodiments, when consolidating power from solar panels with power from a battery, an additional component (e.g., a DC-DC converter) may be needed at the battery to adjust the voltage to the proper voltage (or voltage range) requested by the electric vehicle being charged. The voltage of the solar panels will adjust automatically by following its IV curve to the voltage (or voltage range) requested by the electric vehicle being charged. The output signal is delivered to the electric vehicle at 712. Method 700 determines at 714 whether changes have occurred in the power signals received from the solar cells. As mentioned above, if a cloud temporarily blocks some of the sunlight reaching the solar cells, the voltage and/or current level of the power signals received from the solar cells may decrease. If changes are detected, method 700 makes necessary changes to the consolidation of the power signals to maintain the output signal within the acceptable operating range for the electric vehicle at 716. In some embodiments, method 700 determines if there are changes to a vehicle charging status or associated charging requirements that would necessitate a change in the output signal delivered to the electric vehicle.

Figure 8:
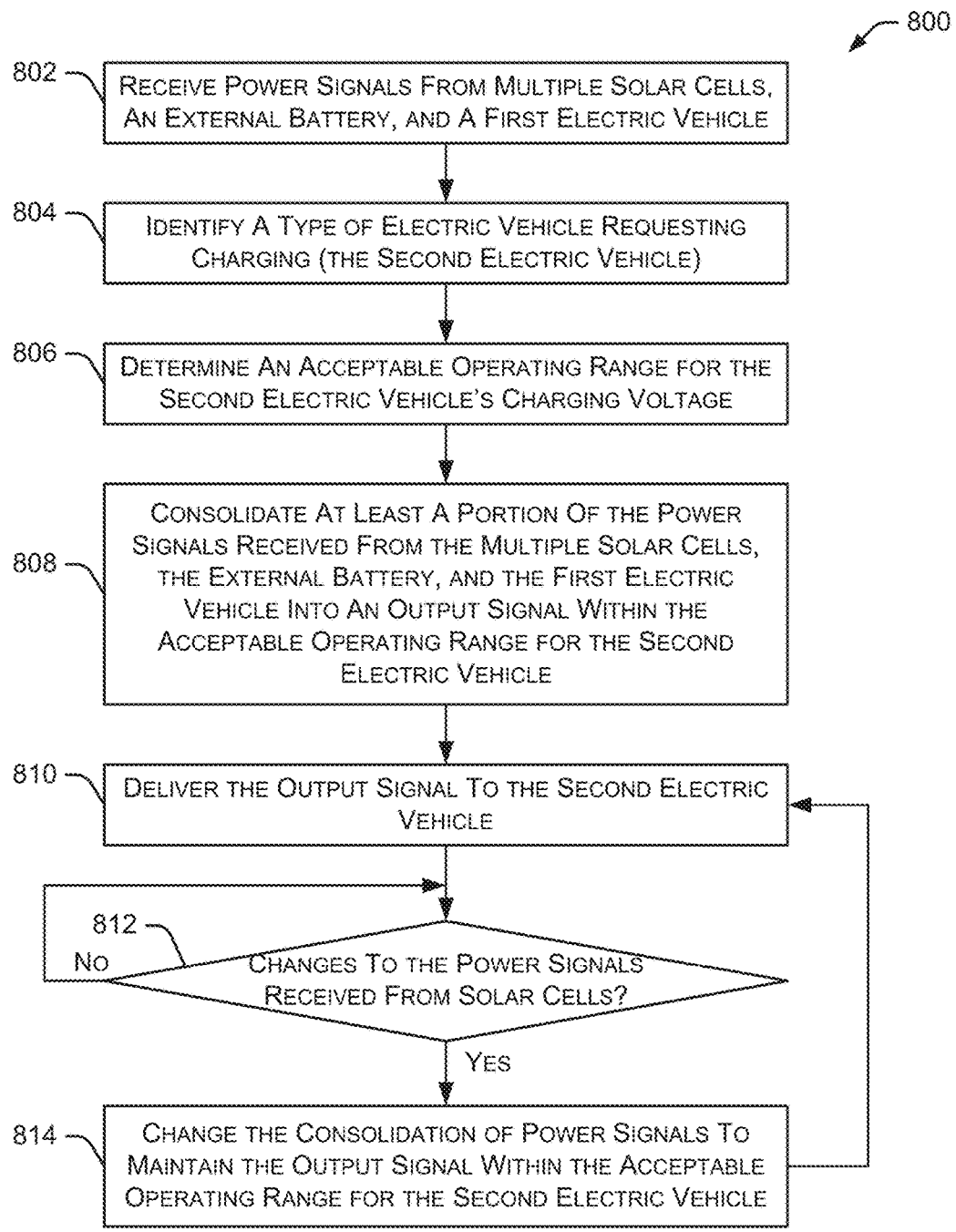
FIG. 8 is a flow diagram depicting an embodiment of a method for charging an electric vehicle using solar cells, an external battery, and power from another electric vehicle.

FIG. 8 is a flow diagram depicting an embodiment of a method 800 for charging an electric vehicle using solar cells, an external battery, and power from another electric vehicle. In some implementations, method 800 is implemented within power manager 110 or 410. Initially, power signals are received from multiple solar cells, an external battery, and a first electric vehicle at 802. Method 800 identifies a type of electric vehicle requesting charging at 804 (referred to as the "second electric vehicle"), and determines an acceptable operating range for the second electric vehicle's charging voltage at 806. In some embodiments, method 800 also determines an acceptable operating range for the second electric vehicle's charging current. Method 800 may further consider other operating requirements, such as power allocation requirements among multiple vehicles or user-specified charging requirements.

Method 800 continues at 808 by consolidating at least a portion of the power signals received from the multiple solar cells, the external battery, and the first electric vehicle into an output signal within the acceptable operating range (e.g., voltage and/or current operating ranges) for the second electric vehicle. The output signal is delivered to the electric vehicle at 810. Method 800 determines at 812 whether changes have occurred in the power signals received from the solar cells. As previously mentioned, if a cloud temporarily blocks some of the sunlight reaching the solar cells, the voltage and/or current level of the power signals received from the solar cells may decrease. If changes are detected, method 800 makes necessary changes to the consolidation of the power signals to maintain the output signal within the acceptable operating range for the second electric vehicle at 814. In some embodiments, method 800 also determines if there are changes to a vehicle charging status or associated charging requirements that would necessitate a change in the output signal delivered to the electric vehicle.

Figure 9:
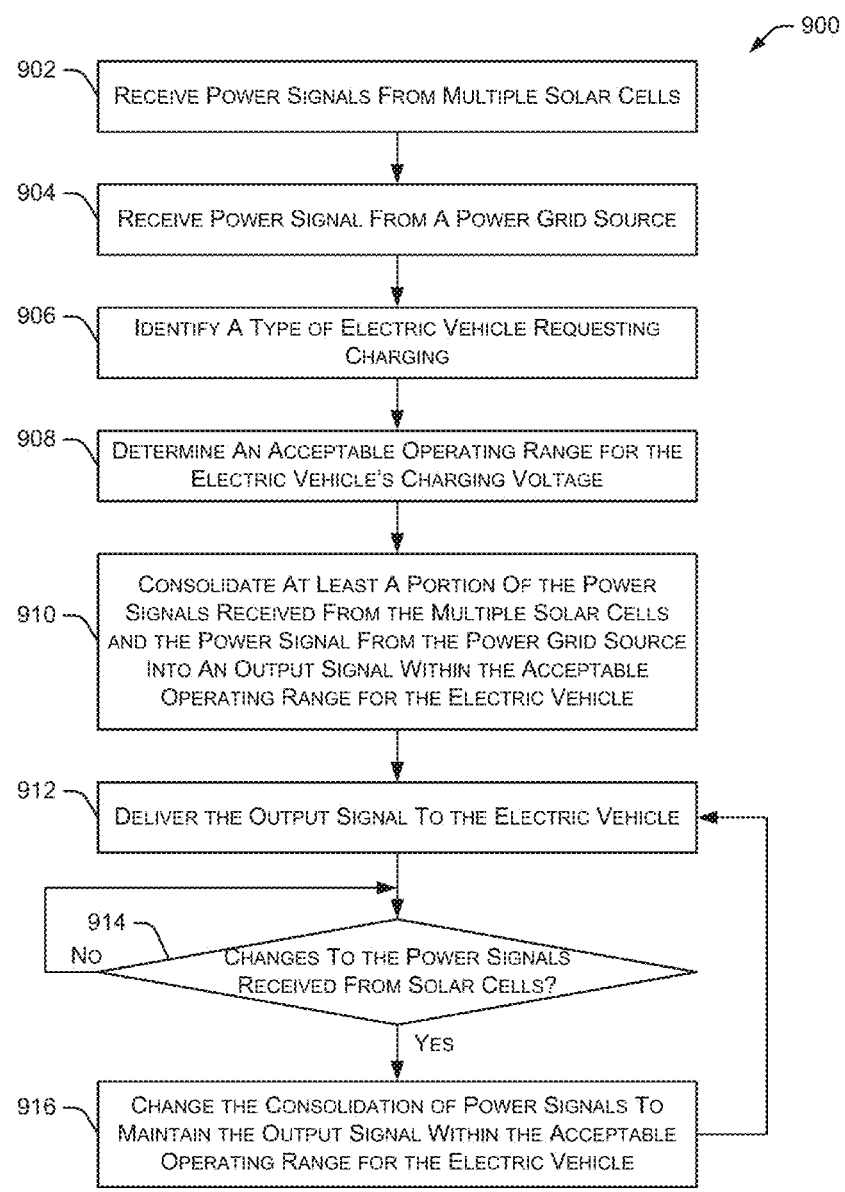
FIG. 9 is a flow diagram depicting an embodiment of a method for charging an electric vehicle using solar cells and a power grid source.

FIG. 9 is a flow diagram depicting an embodiment of a method 900 for charging an electric vehicle using solar cells and a power grid source. In some embodiments, method 900 is implemented within power manager 110 or 410. Initially, power signals are received from multiple solar cells at 902 and from a power grid source at 904. Method 900 identifies a type of electric vehicle requesting charging at 906 and determines an acceptable operating range for the electric vehicle's charging voltage at 908. In some embodiments, method 900 also determines an acceptable operating range for the electric vehicle's charging current. Method 900 may further consider other operating requirements, such as power allocation requirements among multiple vehicles or user-specified charging requirements.

Method 900 continues at 910 by consolidating at least a portion of the power signals received from the multiple solar cells and the power signal received from the power grid source into an output signal within the acceptable operating range (e.g., voltage and/or current operating ranges) for the electric vehicle. In some embodiments, a rectifier is used to convert AC power from the grid to a DC power signal. A specific embodiment steps up the voltage from the grid (e.g., from 208 volts to 350-400 volts) and uses a rectifier to convert from AC to DC. In some embodiments, the power from the solar cells is inverted into AC power (using an inverter) that is delivered through the Level 2 port to the electric vehicle. This AC power can be combined with power from the grid or from a rectifier by adding the two power signals through one or more circuit breakers. When charging through the Level 2 port, the charger on the electric vehicle converts the AC signal back into DC and delivers the DC power to the battery in the electric vehicle. In this situation, the charger in the electric vehicle handles the matching required to meet the charging needs of the electric vehicle's battery.

The output signal is delivered to the electric vehicle at 912. Method 900 determines at 914 whether changes have occurred in the power signals received from the solar cells. As mentioned above, if a cloud temporarily blocks some of the sunlight reaching the solar cells, the voltage and/or current level of the power signals received from the solar cells may decrease. If changes are detected, method 900 makes necessary changes to the consolidation of the power signals to maintain the output signal within the acceptable operating range for the electric vehicle at 916. In some embodiments, method 900 determines if there are changes to a vehicle charging status or associated charging requirements that would necessitate a change in the output signal delivered to the electric vehicle.

The method of FIG. 9 can reduce overall operating costs by anticipating demand charges associated with power from the grid. When a demand spike occurs, the described systems and methods can adjust the power consolidation to use more power from the solar cells (or use exclusively solar power), thereby using less power from the grid. When the demand spike ends, the systems and methods can receive more power from the grid, having avoided the more costly demand spike.

Figure 10:
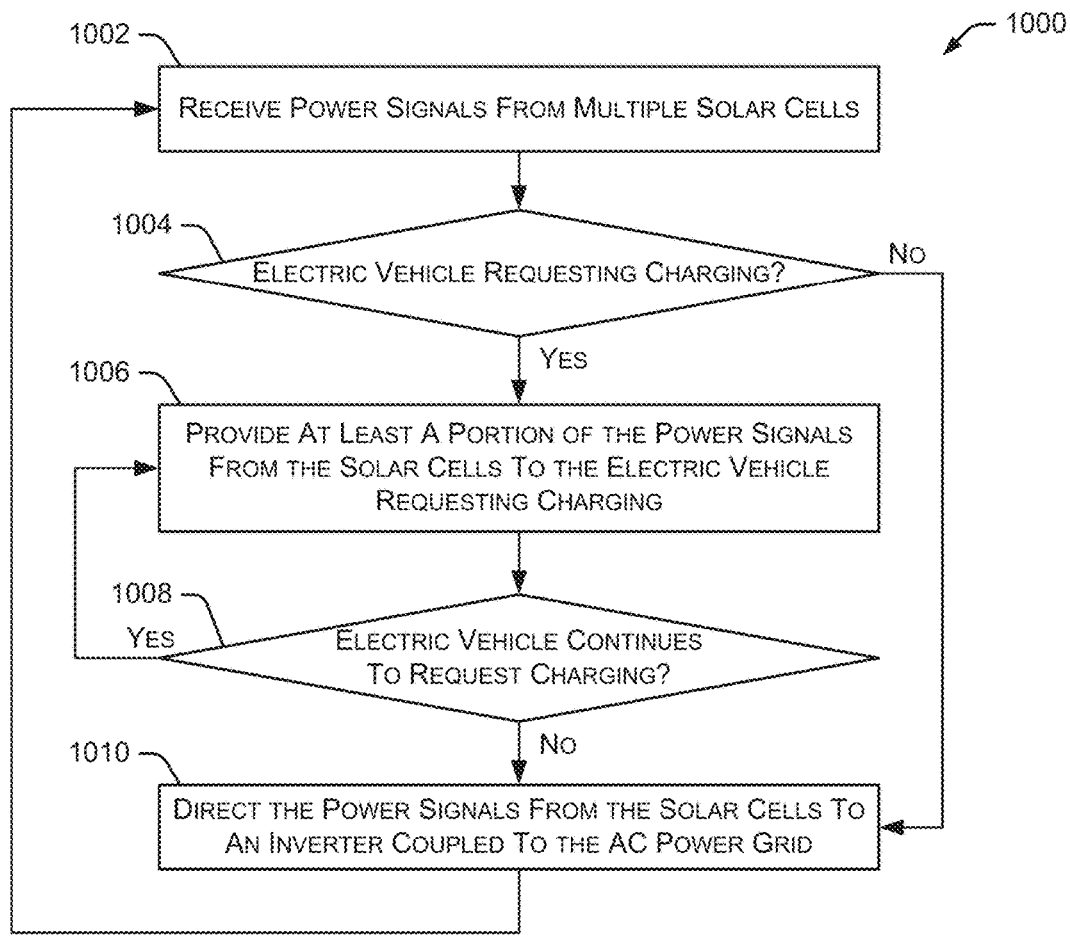
FIG. 10 is a flow diagram depicting an embodiment of a method for switching power signals from solar cells between an electric vehicle and a power grid.

FIG. 10 is a flow diagram depicting an embodiment of a method 1000 for switching power signals from solar cells between an electric vehicle and a power grid. In some embodiments, method 1000 is implemented within power manager 110 or 410. Initially, power signals are received from multiple solar cells at 1002. Method 1000 determines whether an electric vehicle is requesting charging at 1004. If so, the method provides at least a portion of the power signals from the solar cells to the electric vehicle requesting charging at 1006. As long as the electric vehicle continues to request charging at 1008, at least a portion of the power signals from the solar cells are provided to the electric vehicle. When the electric vehicle no longer requests charging, method 1000 directs some or all of the power signals from the solar cells to an inverter coupled to the AC power grid at 1010. The power from the solar cells is directed to the inverter until an electric vehicle requests charging.

In particular embodiments, the described systems and methods can operate as an AC grid connected resource. For example, the systems and methods described herein can be configured to sell power back to the grid when the solar cells are creating more power than is presently needed to charge electric vehicles. If no electric vehicles need the solar power (or do not need all of the power generated by the solar cells), the unused solar panel strings can be connected to an inverter, which delivers the excess power to the grid. This is particularly useful, for example, on weekends or holidays at an office location when few electric vehicles are present. Providing the excess power to the grid helps offset the costs associated with building and managing the described systems and methods. This embodiment can be implemented using an inverter coupled to the grid. Furthermore, the inverter could be capable of delivering a 240 VAC power signal to an electric vehicle through its Level 2 charging port when the system is not connected to the grid. When the electric vehicle is finished charging, and no other electric vehicles need charging, the system reconnects to the grid.

In some embodiments, the described systems and methods can charge one or more electric vehicles while simultaneously selling some of the power generated by the solar cells back to the grid. For example, if there are four strings of solar cells, but only two of the strings are presently used to charge electric vehicles, the output power from the other two solar cells can be connected to an inverter that is selling the power back into the grid and/or reducing onsite customer load on the grid.

Figure 11:
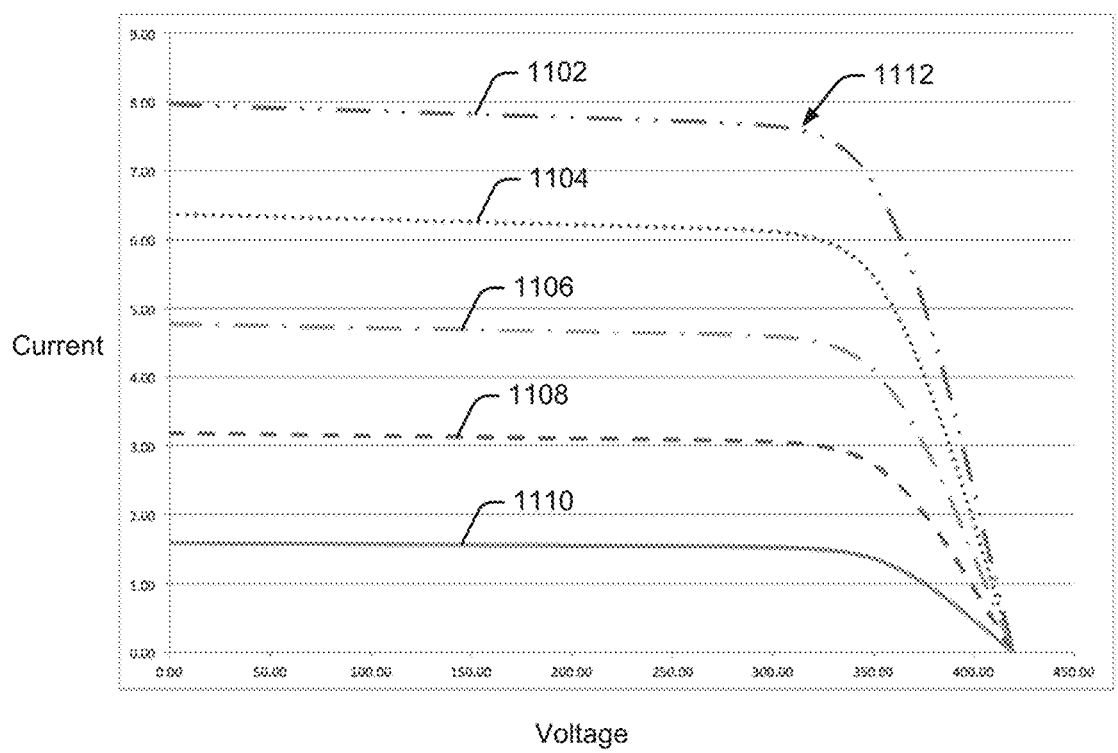
FIG. 11 is an example depiction of multiple IV curves at different levels of irradiance.

FIG. 11 is an example depiction of multiple IV curves at different levels of irradiance. The vertical scale in FIG. 11 indicates changes in current based on changes in light intensity. The horizontal scale in FIG. 11 indicates changes in voltage based on ambient temperature changes. Line 1102 shows the IV curve at an irradiance of 1000 W/m$^2$, line 1104 shows the IV curve at an irradiance of 800 W/m$^2$, line 1106 shows the IV curve at an irradiance of 600 W/m$^2$, line 1108 shows the IV curve at an irradiance of 400 W/m$^2$, and line 1110 shows the IV curve at an irradiance of 200 W/m$^2$. The IV curves shown in FIG. 11 are based on an air mass of 1.5 and a solar cell temperature of 25 degrees Celsius. The air mass coefficient defines the direct optical path length through the Earth's atmosphere, and is a ratio of the optical path length compared to the path length vertically upwards. An air mass of 1.5 represents the longer path length the sun's rays travel through the atmosphere in the Northern Hemisphere where the rays are oblique to the surface (as compared to unity if they are perpendicular to the surface).

As shown in FIG. 11, an apex 1102 of the IV curves is the maximum power point (MPP) of the IV curve (where the product of the current, I, times the voltage, V, is equal to the largest power, P). In some embodiments, the voltage provided by one or more solar cells varies with temperature, but is typically within the range of 350-400 volts at typical temperature ranges in moderate climates. When the solar cells are connected to an electric vehicle, the battery in the electric vehicle determines the voltage so that the battery voltage and the solar cell voltage are close to one another. As discussed above, the voltage of the solar panels will adjust automatically to the voltage (or voltage range) requested by the electric vehicle being charged by moving to a point on the IV curves where the two voltages match. When charging from one battery to another, since batteries do not have IV curves, an additional component (e.g., control logic and/or power module) is used to adjust/match voltages between the two batteries.

After an electric vehicle is connected to the solar cells, the solar cells will drift up and down the IV curve shown in FIG. 11 to match the voltage of the battery in the electric vehicle. This drift will cause the solar cells to move out of the MPP of the IV curve to maintain the voltage match. The described system allows the solar cells to charge an electric vehicle's battery without any additional power components.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. An apparatus for charging an electric vehicle, the apparatus comprising:
    a plurality of solar cells, wherein at least one of the plurality of solar cells is configured to generate a power signal having a voltage determined by a battery in the electric vehicle; and
    a power manager coupled to the plurality of solar cells and configured to receive the power signal from each of the plurality of solar cells, wherein the power manager is further configured to generate an output signal based on at least a portion of the received power signals, and wherein the power manager is configured to provide the output signal to at least one of a plurality of electric vehicles coupled to the power manager.

2. The apparatus of claim 1, further comprising an electrical conductor coupled to the power manager and configured to connect to a charging receptacle of the electric vehicle.

3. The apparatus of claim 1, wherein the power manager is further configured to dynamically adjust the portion of the received power signals used to generate the output signal, the dynamic adjustment based on the present power signal received from each of the plurality of solar cells.

4. The apparatus of claim 1, wherein the power manager includes a power monitoring module configured to monitor the power signals received from the plurality of solar cells.

5. The apparatus of claim 1, wherein the power manager includes a connected vehicle monitor configured to identify the charging requirements of the electric vehicle being charged.

6. The apparatus of claim 1, wherein the power manager is further configured to receive a second power signal from a second electric vehicle, wherein both the output signal and the second power signal are used to charge the electric vehicle.

7. The apparatus of claim 1, wherein the power manager is further configured to receive a second power signal from an external battery, wherein both the output signal and the second power signal are used to charge the electric vehicle.

8. The apparatus of claim 1, wherein the power manager is further configured to receive a second power signal from a power grid source, wherein both the output signal and the second power signal are used to charge the electric vehicle.

9. The apparatus of claim 1, wherein the power manager is further configured to generate multiple output signals, each of which is used to charge a different electric vehicle.

10. A method of charging an electric vehicle, the method comprising:
    receiving power signals from a plurality of solar cells, wherein a voltage associated with each power signal is determined by a battery in the electric vehicle;
    receiving a second power signal from a power grid source;
    determining, using one or more processors, an acceptable operating range for charging the electric vehicle;
    consolidating at least a portion of the received power signals and the second power signal into an output signal within the acceptable operating range for charging the electric vehicle; and
    delivering the output signal to the electric vehicle.

11. The method of claim 10, further comprising selecting a number of consolidated power signals to maintain the output signal within the acceptable operating range for charging the electric vehicle.

12. The method of claim 10, further comprising:
    receiving a second power signal from a second electric vehicle; and
    consolidating the second power signal into the output signal.

13. The method of claim 10, further comprising:
    receiving a second power signal from an external battery; and
    consolidating the second power signal into the output signal.

14. An apparatus comprising:
    at least one solar cell configured to generate a power signal having a voltage determined by a battery being charged by the solar cell; and
    a power manager coupled to the solar cell and configured to receive the power signal from the solar cell, wherein the power manager is further configured to generate an output signal based on the received power signal and configured to provide the output signal to at least one of a plurality of electric vehicles coupled to the power manager, and wherein a current delivered by the output signal corresponds to a position on an I-V curve associated with the solar cell.

15. The apparatus of claim 14, wherein the output signal corresponds to a fixed position or a varying position on the I-V curve.

16. The apparatus of claim 14, wherein the power manager is further configured to receive a second power signal from a second power source, wherein both the output signal and the second power signal are used to charge the electric vehicle.

17. An apparatus for charging an electric vehicle, the apparatus comprising:
    a plurality of solar cells, wherein at least one of the plurality of solar cells is configured to generate a power signal having a voltage determined by a battery in the electric vehicle; and
    a power manager coupled to the plurality of solar cells and configured to receive the power signal from each of the plurality of solar cells, wherein the power manager is further configured to generate an output signal based on at least a portion of the received power signals, and wherein the power manager is further configured to provide the output signal to a plurality of electric vehicles, where each of the plurality of electric vehicles are coupled to the plurality of solar cells.

* * * * *